United States Patent [19]

Kirn

[11] Patent Number: 4,652,951
[45] Date of Patent: Mar. 24, 1987

[54] MAGNETIC HEAD INDEXING MECHANISM

[75] Inventor: Thomas G. Kirn, Rochester, N.Y.

[73] Assignee: Eastman Kodak Company, Rochester, N.Y.

[21] Appl. No.: 746,431

[22] Filed: Jun. 19, 1985

[51] Int. Cl.$^4$ ............................................. G11B 21/08
[52] U.S. Cl. .................................................... 360/106
[58] Field of Search ......................................... 360/106

[56] References Cited

U.S. PATENT DOCUMENTS

| | | | |
|---|---|---|---|
| 3,665,433 | 5/1972 | Gillum et al. | 360/106 |
| 3,721,967 | 3/1973 | Englert et al. | 360/106 |
| 3,969,768 | 7/1976 | Ebbing | 360/107 |
| 4,005,493 | 1/1977 | Morgan | 360/106 |
| 4,012,791 | 3/1977 | Bleiman | 360/99 |
| 4,096,537 | 6/1978 | Butsch | 360/106 |
| 4,136,369 | 1/1979 | Morgan | 360/106 |
| 4,315,290 | 2/1982 | Kukreja | 360/106 |
| 4,441,130 | 4/1984 | Boehm et al. | 360/106 |
| 4,466,032 | 8/1984 | Saito | 360/99 |
| 4,470,088 | 9/1984 | Fick | 360/105 |
| 4,528,607 | 7/1985 | Thompson | 360/106 |

*Primary Examiner*—Robert S. Tupper
*Attorney, Agent, or Firm*—Roger A. Fields

[57] ABSTRACT

In an indexing mechanism for advancing a transducer with respect to a rotated disk to record and/or play back information on the disk, the transducer is mounted on a cylindrical carrier having a flat surface along one of its sides. A fixed guide supports the carrier for longitudinal movement along a reference axis defining the direction of travel of the carrier relative to the rotated disk. The carrier is moved by a stepper motor which rotates a lead screw in threading engagement with the carrier. A pair of flat support surfaces of the guide contact the flat surface of the carrier along respective parallel lines arranged parallel to the reference axis. Another flat support surface of the guide contacts the cylindrical portion of the carrier along a line arranged parallel to the first two lines. Thus a three-point support is provided for the carrier which prevents it from being rolled about the reference axis as the lead screw is rotated to move the carrier along the axis.

8 Claims, 2 Drawing Figures

MAGNETIC HEAD INDEXING MECHANISM

BACKGROUND OF THE INVENTION

1. Field of the Invention

The invention generally relates to apparatus for advancing a transducer with respect to a rotated disk to record and/or play back information on the disk. More particularly, the invention relates to an improved indexing mechanism for the transducer, which substantially prevents any roll of the transducer about an axis defining the direction of travel of the transducer relative to the rotated disk.

2. Description of the Prior Art

Magnetic disks for storing information have been available for several years in the form of "floppy" flexible disks typically made by coating one or both faces of a thin, highly flexible sheet of polymeric or other plastic film with magnetic oxide. This limpy flexible disk is usually permanently enclosed within a close-fitting, protective outer envelope, in which the disk is freely rotatable. The envelope has an enlarged central opening for access to a hub at the center of the disk to rotate the disk. A radical slot opening is provided in the envelope to permit a magnetic head to access a magnetic-oxide coated face of the disk as the disk is rotated. The magnetic head is translated radially across the face of the disk in incremental steps to predetermined positions, each of which corresponds to an individual narrow, closely spaced, circular recording track on the disk.

A common form of an indexing mechanism for advancing a magnetic head radially from track to track on a rotated disk comprises a carrier which supports the magnetic head and a guide along which the carrier is translated. As depicted in U.S. Pat. Nos. 3,665,433 and 3,721,967, the carrier may take the form of a wheeled carriage and the guide may take the form of rails or grooves for supporting the wheels of the carriage. Often, for example in U.S. Pat. Nos. 3,969,768 and 4,012,791, a lead screw is threadedly engaged with the carrier. A stepper motor rotates the lead screw in incremental steps to move the carrier and the magnetic head. Because the magnetic head is positioned in alignment with the successive recording tracks on the rotated disk, it is especially important that the head be precisely located with respect to the tracks, and that it be accurately held in place at each track. However, a problem existing in prior art indexing mechanisms is that rotation of the lead screw can cause the carrier to roll slightly about its travel axis. This will result in a similar rolling of the magnetic head relative to the recording tracks on the rotated disk. Consequently, the head-to-disk position may be changed from the preferred angle, causing some signal drop-off.

SUMMARY OF THE INVENTION

The invention solves the above-described problem existing in prior art indexing mechanisms for magnetic heads by preventing the carrier for the magnetic head from being rolled about its travel axis as the carrier is moved along the axis.

According to the invention there is provided, in apparatus for advancing a transducer with respect to a rotated disk to record and/or play back information on the disk, wherein (a) a carrier for the transducer is movable along a reference axis defining a direction of travel relative to the rotated disk, (b) a fixed guide supports the carrier for movement along the reference axis and (c) a lead screw connected to the carrier is rotated to move the carrier with respect to the guide, the improvement wherein:

said carrier has first and second generally flat surface areas, substantially in a single plane, extending along respective parallel lines arranged parallel to the reference axis, and a third surface area spaced from the plane extends along another line arranged parallel to the first two lines; and said guide includes generally flat means for supporting the carrier at its first and second generally flat surface areas and another means for supporting the carrier at its third surface area, whereby a three-point support is provided for the carrier which prevents it from being rolled about the reference axis as the lead screw is rotated to move the carrier along the axis.

Preferably, the invention is embodied in an indexing mechanism for advancing a magnetic head with respect to a rotated floppy disk to record and/or play back information on the disk. The magnetic head is mounted on a carrier which is cylindrical in shape except for a flat surface along one of its sides. A fixed guide supports the carrier for longitudinal movement along a reference axis defining the direction of travel of the carrier relative to the rotated disk. The carrier is moved by rotating an internal lead screw threadedly engaging the carrier about the reference axis. A pair of flat support surfaces of the guide contact the flat surface of the carrier along respective parallel lines arranged parallel to the reference axis. Another flat support surface of the guide contacts the cylindrical portion of the carrier along a line arranged parallel to the first two lines. Thus a three-point support is provided for the carrier which prevents it from being rolled about the reference axis as the lead screw is rotated to move the carrier along the axis.

BRIEF DESCRIPTION OF THE DRAWINGS

The invention will be described in connection with the drawings, wherein.

DESCRIPTION OF THE PREFERRED EMBODIMENT

Figure 1:
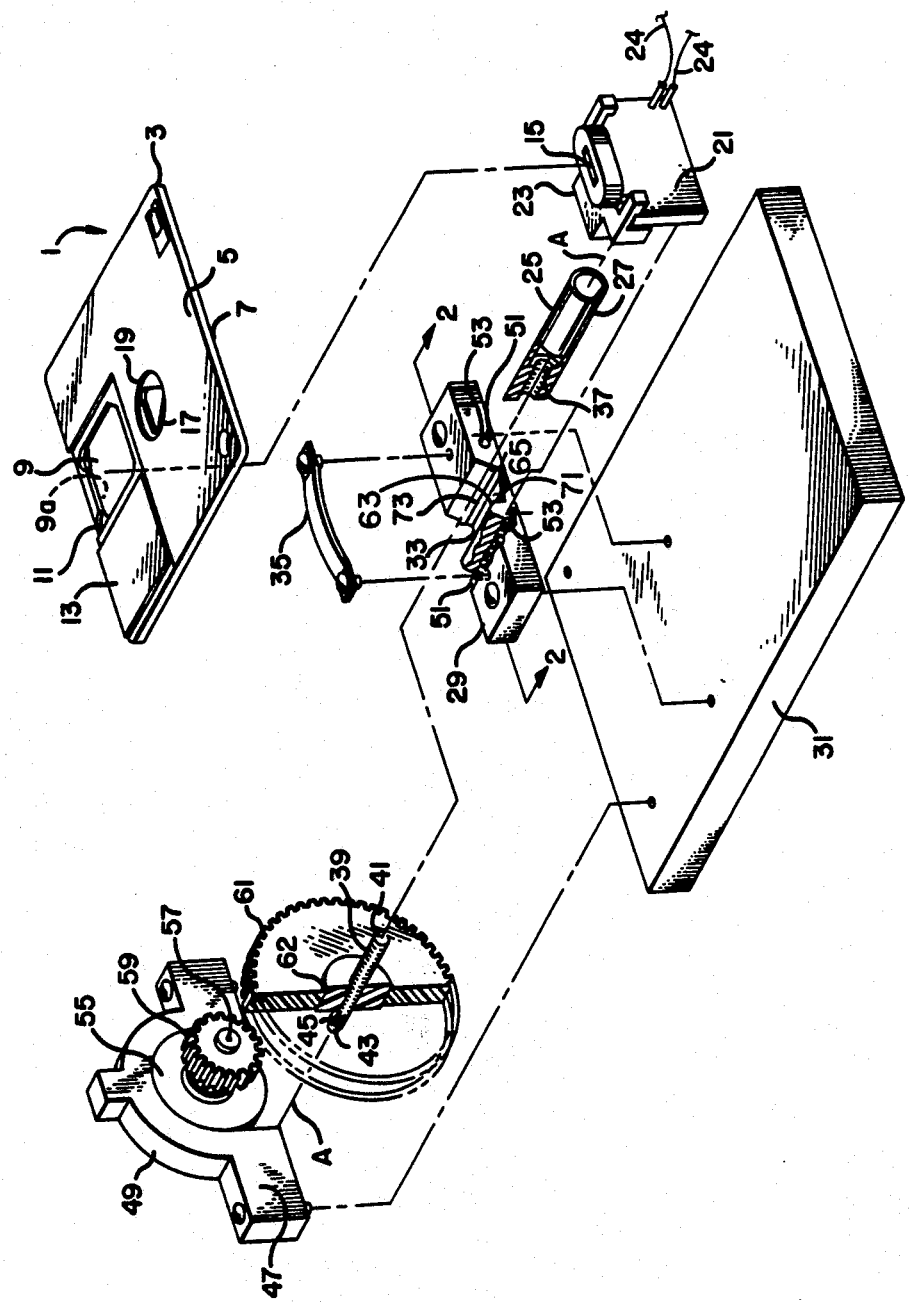
FIG. 1 is an exploded perspective view of a magnetic head indexing mechanism in accordance with a preferred embodiment of the invention.

Referring now to the drawings, and in particular to FIG. 1, there is shown a magnetic disk cartridge 1 intended for use in a flexible disk recording and/or playback apparatus. The cartridge 1, as described in detail in U.S. Pat. No. 4,466,032, granted Aug. 14, 1984, includes a substantially flat rectangular jacket 3 having opposed walls 5 and 7 between which a flexible disk 9 of magnetic material is freely rotatable. The opposed walls 5 and 7 have aligned access-openings 11 which extend in the radial direction of the disk 9 slightly beyond the inner and outer effective limits of a recording/playback surface 9a on the disk. A double door member 13 normally covers the aligned access-openings 11 to protect the disk 9. However, the door member 13 is slidable to an opened position in which it is removed from the openings 11, as shown in FIG. 1. When the door member 13 is opened, a magnetic head 15 can extend through one of the openings 11 to access the record/playback surface 9a of the disk 9, as indicated in FIG. 1. Details of the magnetic head 15 are described in commonly assigned, U.S. Pat. No. 4,578,727. A hub 17 is provided at the center of the disk 9, beneath aligned openings 19 in the opposed walls 5 and 7 of the jacket 3. In operation, the hub 17 is coupled with a drive shaft (not shown) to rotate the disk 9, and the magnetic head 15 is translated radially in contact with the recording/playback surface 9a of the disk to record and/or playback information on such surface. The disk 9 shown in FIG. 1 is intended to have fifty concentric recording tracks, each having a very narrow width. The distance between the successive tracks, that is the track pitch, is not as narrow as the track width.

FIG. 1 shows in exploded perspective form a bi-directional indexing mechanism for advancing the magnetic head 15 radially from track to track on the rotated disk 9. The magnetic head 15 is mounted on a shoe 21 connected to a bracket 23. A pair of flexible leads 24 couple the magnetic head 15 with the appropriate electronics in the recording and/or playback apparatus. The bracket 23 is secured to one end of a cylindrical carrier 25 having a flat surface 27 along one of its sides. A guide 29, fixed to a base plate 31, supports the carrier 25 for longitudinal movement along a reference axis A in common with the center line of the carrier. The reference axis A defines the direction of travel of the carrier 25 relative to the rotated disk 9. As can be seen most clearly in FIG. 2, the carrier 25 is seated in a v-like cut-out 33 in the guide 29. A leaf spring 35, secured to the guide 29, biases the carrier 25 into the cut-out 33 but does not prevent longitudinal movement of the carrier along the reference axis A. The carrier 25 has an internal thread 37 which is evenly disposed about the reference axis A and mates with the thread 39 of a lead screw 41. Thus rotation of the lead screw 41 (in place) about the reference axis A will cause the carrier 25 to move along the reference axis.

A ball 43 is secured partially within a socket 45 in one end of the lead screw 41. The ball 43 is intended to be in contact with a reference surface 47 of a yoke 49, fixed to the base plate 31. A pair of helical tension springs 51 extend through respective bores 53 in the guide 29, proximate opposite sides of the cut-out 33 in the guide. The opposite ends of the springs 51 are anchored to the guide 29 and to the bracket 23, in order to bias the ball 43 at one end of the lead screw 41 against the reference surface 47 of the yoke 49.

A bi-directional stepper motor 55 is provided for rotating the lead screw 41 in either of two opposite directions. The stepper motor 55 is secured to the yoke 49 and has a drive shaft 57 fixed to a reduction gear 59 which, in turn, engages a drive gear 61 concentrically secured to the lead screw 41 by a common bushing 62.

Figure 2:
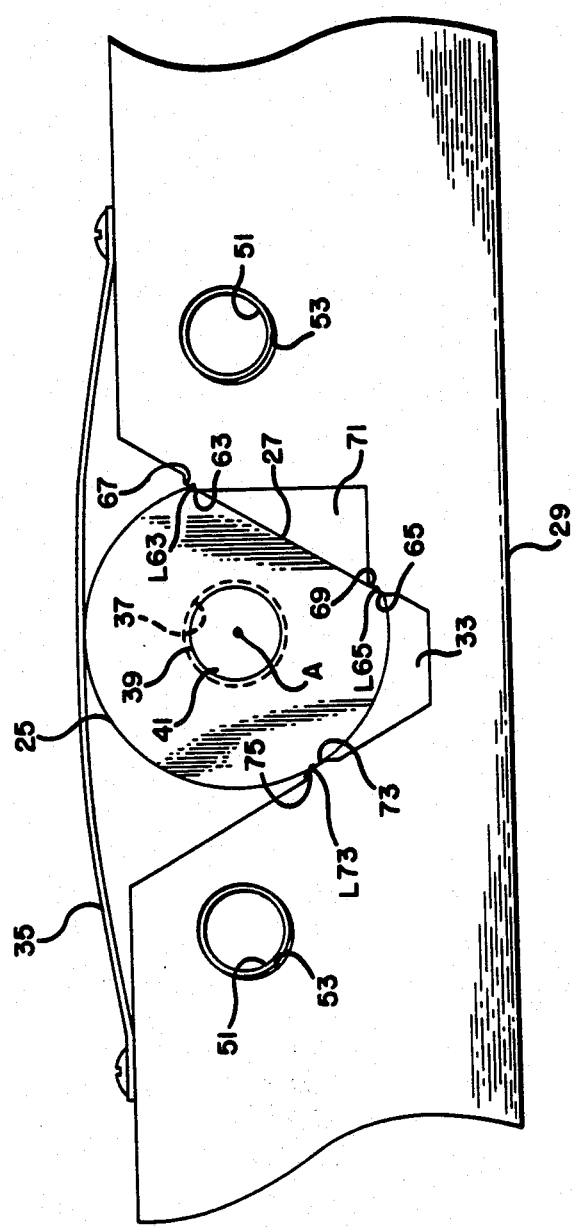
FIG. 2 is a sectional view of the indexing mechanism as seen in the direction of the arrows from the line 2—2 in FIG. 1.

As shown in FIG. 2, the guide 29 has a pair of flat support surfaces 63 and 65 facing the cut-out 33 in the guide. The support surfaces 63 and 65 are disposed in the same plane to intimately contact spaced, co-planar sections 67 and 69 of the flat surface 27 of the carrier 25. This contact is along respective parallel lines L63 and L65 arranged parallel to the reference axis A. A gap 71 exists between the support surfaces 63 and 65 of the guide 29 to prevent the guide from contacting the flat surface 27 of the carrier 25 except along the separate co-planar sections 67 and 69 of the flat surface. The guide 29 has a third flat support surface 73 facing the cut-out 33, which is disposed to tangentially contact a cylindrical section 75 of the cylindrical surface of the carrier 25. This contact is along a line L73 arranged parallel to the two lines L63 and L65. Thus a three-point support is provided for the carrier 25 along the lines L63, L65 and L73 which prevents the carrier from being rolled about the reference axis A as the lead screw 41 is rotated to move the carrier along the axis.

While the invention has been described with respect to a preferred embodiment, it will be understood that various modifications may be effected within the ordinary skill in the art without departing from the scope of the invention.

I claim:

1. In apparatus for advancing a transducer with respect to a rotated disk to record and/or play back information on the disk, wherein (a) a carrier for the transducer is movable along a reference axis defining a direction of travel relative to the rotated disk and (b) a guide supports said carrier for movement along the reference axis, the improvement wherein:

said carrier has first and second generally flat areas, substantially in a single plane, extending along respective parallel lines arranged parallel to the reference axis, and a third surface area spaced from the plane extends along another line arranged parallel to the first two lines; and said guide includes gnerally flat means for supporting said carrier at its first and second generally flat surface areas and another means for supporting the carrier at its third surface area, whereby a three-point support is provided which prevents said carrier from being rolled about the reference axis as the carrier is moved along the axis.

2. The improvement as recited in claim 1, wherein said generally flat supporting means of said guide includes first and second generally flat surface areas of said carrier for separately contacting the two surface areas.

3. The improvement as recited in claim 2, wherein said third surface area of said carrier is curved about the reference axis in a plane perpendicular to the axis and said other supporting means of said guide includes a third support surface spaced from the plane of said first and second support surfaces of the guide for contacting said third surface area of the carrier.

4. In apparatus for advancing a transducer with respect to a rotated disk to record and/or play back information on the disk, wherein (a) a carrier for the transducer is movable along a reference axis defining a direction of travel relative to the rotated disk, (b) a fixed guide supports said carrier for movement along the reference axis and (c) a lead screw connected to said carrier is rotated to move the carrier with respect to said guide, the improvement wherein:

said carrier has a pair of flat surface areas, substantially in a single plane, longitudinally extending along respective parallel lines arranged parallel to the reference axis, and a semi-cylindrical surface area curved about the reference axis longitudinally extends along another line arranged parallel to the first two lines; and said guide includes respective flat means for supporting said carrier in contiguous relation at its flat surface areas and another flat means for supporting said carrier in tangential relation at its semi-cylindrical surface area, whereby a three-point support is provided which prevents said carrier from being rolled about the reference axis as said lead screw is rotated to move the carrier along the axis.

5. The improvement as recited in claim 4, wherein said lead screw has a rotation axis in common with the reference axis, a reference surface is disposed substantially in a plane perpendicular to the rotation axis, and spring means couples said carrier and said guide for biasing said lead screw along its rotation axis toward said reference surface.

6. The improvement is recited in claim 4, wherein said lead screw has a rotation axis in common with the reference axis, a reference surface is disposed substantially in a plane perpendicular to the rotation axis, a ball is coupled to one end of said lead screw to contact said reference surface, and spring means couples said carrier and said guide for biasing said lead screw along its rotation axis to position said ball against said reference surface.

7. In apparatus for advancing a transducer with respect to a rotated disk to record and/or play back information on the disk, wherein (a) a carrier for the transducer is movable along a reference axis defining a direction of travel relative to the rotated disk, (b) a fixed guide supports said carrier for movement along the reference axis and (c) a lead screw connected to said carrier is rotated to move the carrier with respect to said guide, the improvement wherein:

said carrier is cylindrical in shape, except for a flat surface along one side, and has a center line in common with the reference axis and an internal thread concentrically disposed about the center line for mating with said lead screw; and said guide includes a pair of flat support surfaces contacting said flat side of said carrier along respective parallel lines arranged parallel to the reference axis and another flat support surface contacts a cylindrical portion of said carrier along a line arranged parallel to the first two lines, whereby a three-point support is provided which prevents said carrier from being rolled about the reference axis as said lead screw is rotated to move the carrier along the axis.

8. The improvement as recited in claim 7, wherein said guide includes means defining a gap between said pair of flat support surfaces to prevent the guide from contacting said flat side of said carrier at any location between the two support surfaces.

* * * * *